(12) United States Patent
Lee et al.

(10) Patent No.: US 10,365,685 B2
(45) Date of Patent: Jul. 30, 2019

(54) DISPLAY APPARATUS

(71) Applicant: LG Display Co., Ltd., Seoul (KR)

(72) Inventors: Sungtae Lee, Bucheon-si (KR); YeongRak Choi, Bucheon-si (KR); Sungsu Ham, Bucheon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/018,157

(22) Filed: Jun. 26, 2018

(65) Prior Publication Data
US 2019/0004566 A1 Jan. 3, 2019

(30) Foreign Application Priority Data
Jul. 3, 2017 (KR) .................. 10-2017-0084504

(51) Int. Cl.
| | | |
|---|---|---|
| G06F 1/16 | (2006.01) | |
| H04R 9/02 | (2006.01) | |
| H04R 9/06 | (2006.01) | |
| H04R 9/04 | (2006.01) | |
| H04M 1/03 | (2006.01) | |
| H04R 1/02 | (2006.01) | |

(52) U.S. Cl.
CPC .......... *G06F 1/1605* (2013.01); *G06F 1/1626* (2013.01); *H04M 1/03* (2013.01); *H04R 1/025* (2013.01); *H04R 9/025* (2013.01); *H04R 9/045* (2013.01); *H04R 9/06* (2013.01); *H04R 2499/11* (2013.01); *H04R 2499/15* (2013.01)

(58) Field of Classification Search
CPC ............ H04R 2499/11; H04R 2499/15; H04R 9/025; G06F 1/1605; H04M 1/03
See application file for complete search history.

(56) References Cited

U.S. PATENT DOCUMENTS

| | | | | |
|---|---|---|---|---|
| 5,790,679 | A * | 8/1998 | Hawker | H04M 1/0202 |
| | | | | 379/388.02 |
| 7,385,482 | B2 * | 6/2008 | Wada | H04R 1/028 |
| | | | | 340/384.1 |
| 7,657,042 | B2 * | 2/2010 | Miyata | G02F 1/133 |
| | | | | 381/152 |
| 7,826,134 | B2 * | 11/2010 | Choi | G03B 21/60 |
| | | | | 359/445 |
| 2005/0025330 | A1 * | 2/2005 | Saiki | H04R 7/04 |
| | | | | 381/388 |
| 2006/0039575 | A1 * | 2/2006 | Wada | H04R 1/025 |
| | | | | 381/152 |
| 2007/0248236 | A1 * | 10/2007 | Miyata | G09F 27/00 |
| | | | | 381/152 |
| 2010/0328328 | A1 * | 12/2010 | Choi | B06B 1/0688 |
| | | | | 345/530 |
| 2011/0037734 | A1 * | 2/2011 | Pance | G06F 3/016 |
| | | | | 345/177 |

(Continued)

*Primary Examiner* — Adrian S Wilson
(74) *Attorney, Agent, or Firm* — Morgan, Lewis & Bockius LLP (57) ABSTRACT

A display apparatus includes a display panel configured to display an image by emitting light, a supporting member on a rear surface of the display panel, and a sound generator between the display panel and the supporting member. The sound generator includes a magnetic circuit unit and a voice coil unit on the rear surface of the display panel, and the magnetic circuit unit and the voice coil unit are configured to vibrate the display panel to generate sound.

22 Claims, 6 Drawing Sheets

(56) References Cited

U.S. PATENT DOCUMENTS

| | | | | |
|---|---|---|---|---|
| 2012/0126959 A1* | 5/2012 | Zarrabi | ............... | B06B 1/0688 |
| | | | | 340/407.1 |
| 2012/0243719 A1* | 9/2012 | Franklin | ............... | G06F 1/1652 |
| | | | | 381/333 |
| 2013/0094126 A1* | 4/2013 | Rappoport | ............. | G02B 27/01 |
| | | | | 361/679.01 |
| 2013/0328820 A1* | 12/2013 | Kondoh | ............... | G06F 1/1656 |
| | | | | 345/173 |
| 2014/0004913 A1* | 1/2014 | Kimura | ............... | H04M 1/035 |
| | | | | 455/575.1 |
| 2014/0160040 A1* | 6/2014 | Kang | ............... | H04R 17/005 |
| | | | | 345/173 |
| 2015/0078604 A1* | 3/2015 | Seo | ............... | H04R 1/028 |
| | | | | 381/333 |
| 2016/0050472 A1* | 2/2016 | Lee | ............... | H04R 1/028 |
| | | | | 381/333 |
| 2017/0280234 A1* | 9/2017 | Choi | ............... | G06F 1/1605 |
| 2017/0287990 A1* | 10/2017 | Choi | ............... | G06F 1/1637 |
| 2017/0289694 A1* | 10/2017 | Choi | ............... | G06F 1/1605 |
| 2018/0317012 A1* | 11/2018 | Lee | ............... | H04R 7/045 |
| 2018/0348816 A1* | 12/2018 | Lee | ............... | G06F 1/1605 |

\* cited by examiner

DISPLAY APPARATUS

CROSS-REFERENCE TO RELATED APPLICATIONS

This application claims the benefit of the Korean Patent Application No. 10-2017-0084504 filed on Jul. 3, 2017, which is hereby incorporated by reference as if fully set forth herein.

BACKGROUND

Technical Field

The present disclosure relates to a display apparatus, and more particularly, to a display apparatus including a sound generator.

Discussion of the Related Art

With the advancement of an information-oriented society, various requirements for the display field of expressing information in accordance with an electric information signal are increasing, and thus, research is being conducted on various display apparatuses that are thin, light, and have low power consumption.

For example, a display apparatus may be categorized type into a liquid crystal display (LCD) apparatus, a field emission display (FED) apparatus, an organic light emitting display apparatus, etc.

Among the above display apparatuses, the LCD apparatus may include an array substrate including a thin film transistor (TFT), an upper substrate including a color filter and/or a black matrix, and a liquid crystal layer between the array substrate and the upper substrate. An alignment state of the liquid crystal layer is controlled based on an electric field applied to two electrodes of a pixel area, whereby light transmittance is adjusted based on the alignment state of the liquid crystal layer, thereby displaying an image.

Meanwhile, the organic light emitting display apparatus, which is a self-emitting display apparatus, has a fast response time, high emission efficiency, excellent luminance, and a wide viewing angle in comparison with other display apparatuses, and thus, are attracting much attention.

SUMMARY

Recently, display apparatuses applied to televisions (TVs), monitors, mobile devices, etc., have been made slimmer to reduce the thickness of the devices. Therefore, it is desirable to develop a speaker which outputs a high-quality sound in a narrow area of a display apparatus having a thin thickness.

Micro speakers may be applied to display apparatuses such as mobile devices. The micro speakers are small speakers and may be particularly suitable for small-size sound devices, such as portable sound devices, where demand is greatly increasing recently, including portable phones, notebook computers, and earphones. Display apparatuses may receive a sound through a micro speaker from the outside and may output a sound to the outside.

A magnetic type speaker that may be used as a micro speaker includes a magnet and a center pole disposed on a plate, a bobbin disposed near the center pole, and a coil wound around the bobbin. If the magnetic type speaker is applied to a small display apparatus, a thickness of the small display apparatus may be thickened.

Other examples of speakers applied to small display apparatuses include piezo ceramic speakers. Because piezo ceramics have a fast response time of several milliseconds, a frequency range of a vibration is broad. However, because the piezo ceramics are manufactured in a plate shape including a ceramic material, the durability of the piezo ceramics for enduring an external impact is low, and due to this, the piezo ceramics may be easily broken by the external impact. Also, the piezo ceramics are opaque, and it is difficult to reduce the thickness of the piezo ceramics. Also, because the piezo ceramics are disposed on a rear surface of a display apparatus, there is a problem where the piezo ceramics vibrate a whole portion of the display apparatus. Also, the piezo ceramics may output a sound having a middle-high-pitched sound band, but the piezo ceramics have difficulty outputting a sound having a low-pitched sound band.

Therefore, the inventors have recognized the above-described problems and have conducted various experiments for developing a sound generator which is capable of being miniaturized to be applied to display apparatuses having a reduced thickness and to output an enhanced sound. A display apparatus including this sound generator, which may be included in a display apparatus, may enhance the quality of a sound and may be capable of being miniaturized.

Accordingly, the present disclosure is directed to a display apparatus that substantially obviates one or more problems due to limitations and disadvantages of the related art.

An object of the present disclosure is to provide a display apparatus including a sound generator which enhances the quality of a sound and is capable of being miniaturized.

Additional features and aspects will be set forth in the description which follows, and in part will become apparent from the description, or may be learned by practice of the inventive concepts provided herein. Other features and aspects of the inventive concepts may be realized and attained by the structure particularly pointed out in the written description, or derivable therefrom and the claims hereof as well as the appended drawings.

To achieve these and other advantages and in accordance with the purpose of the disclosure, as embodied and broadly described herein, a display apparatus includes a display panel configured to display an image by emitting light; a supporting member on a rear surface of the display panel; and a sound generator between the display panel and the supporting member. The sound generator includes a magnetic circuit unit and a voice coil unit on the rear surface of the display panel, and the magnetic circuit unit and the voice coil unit are configured to vibrate the display panel to generate sound.

In another aspect, a display apparatus comprises a display panel configured to display an image by emitting light; a supporting member on a rear surface of the display panel; a magnetic circuit unit between the display panel and the supporting member; and a voice coil unit including a vibration plate on a rear surface of the display panel and a voice coil on the vibration plate. The magnetic circuit unit and the voice coil unit are configured to vibrate the display panel to generate a sound.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Reference will now be made in detail to the embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where "comprise", "have", and "include" described in the present specification are used, another part may be added unless "only~" is used. The terms of a singular form may include plural forms unless referred to the contrary.

In construing an element, the element is construed as including an error range although there is no explicit description.

In describing a position relationship, for example, when a position relation between two parts is described as "on~", "over~", "under~", and "next~", one or more other parts may be disposed between the two parts unless "just" or "direct" is used.

In describing a time relationship, for example, when the temporal order is described as "after~", "subsequent~", "next~", and "before~", a case which is not continuous may be included unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first", "second", "A", "B", "(a)", and "(b)" may be used herein when describing components of the present disclosure. Each of these terminologies is not used to define an essence, order or sequence of a corresponding component but used merely to distinguish the corresponding component from other component(s). It will be understood that when an element or layer is described as being "connected", "coupled", or "adhered" to another element or layer, the element or layer can be directly connected or adhered to the other element or layer, but the other element or layer can be "disposed" between elements or layers, or elements or layers can be "connected", "coupled", or "adhered" to each other through the other element or layer.

In the present disclosure, examples of a display apparatus include, but are not limited to, an organic light emitting display module (OLED module) or a liquid crystal module (LCM), which include a display panel and a driving unit for driving the display panel. Examples of the display apparatus may further include a set device (or a set apparatus) or a set electronic apparatus, as a final product, such as a notebook computer or a laptop computer, a television set, a computer monitor, equipment apparatuses (e.g., display equipment in an automotive apparatus or other type of vehicle apparatus) or a mobile electronic apparatus that is a complete product or a final product (for example, a smartphone or an electronic pad, etc.) that includes the LCM or the OLED module.

Therefore, in the present disclosure, the display apparatus may reference a display apparatus itself, such as the LCM or the OLED module, and also a set apparatus, which is a final consumer apparatus or an application product including the LCM or the OLED module.

And, in some cases, the LCM or the OLED module including a display panel and a driving unit thereof may be referred to as a display apparatus, or the electronic apparatus as a final product including the LCM or the OLED module may be referred to as a set apparatus. For example, the display apparatus may include a display panel, such as an LCD or an OLED, and a source printed circuit board (PCB) as a controller for driving the same, and the set apparatus may further include a set PCB that is a set controller set to be electrically connected to the source PCB and to control the overall operations of the set apparatus.

A display panel applied to the present example embodiments may use any type of display panel, such as a liquid crystal display panel, an organic light emitting diode (OLED) display panel, and an electroluminescent display panel, but it is not limited to these types. For example, the display panel of the present disclosure may be any panel capable of generating sound in accordance with a vibration by a sound generation device/sound generator. The display panel applied to the example embodiments of the disclosure is not limited in its shape or size.

In the case of a liquid crystal display panel, it may include a plurality of gate lines, a plurality of data lines, and a plurality of pixels respectively provided in a plurality of pixel areas defined by intersections of the gate lines and the data lines. The display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

In the case of an organic light emitting display panel, the display panel may include a plurality of gate lines, a plurality of data lines, and a plurality of pixels respectively provided in a plurality of pixel areas defined by intersections of the gate lines and the data lines. The display panel may include an array substrate including a TFT, which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. The organic light emitting device layer provided on the array substrate may be changed to an inorganic light emitting layer, for example, a nano-sized material layer or the like.

The display panel may further include a backing, such as a metal plate attached on the rear surface of the display panel, but the backing is not limited to the metal plate, and another structure may be included.

In the present disclosure, the display panel including a sound generator may be implemented at a user interface module in a vehicle such as the central control panel area in an automobile. For example, such a display panel may be configured between two front seat occupants such that sounds due to a vibration of the display panel propagate towards the interior of the vehicle. As such, the audio experience within a vehicle can be improved when compared to having speakers only at the interior sides in the vehicle.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, example embodiments of the present disclosure will be described in detail with reference to the accompanying drawings.

Figure 1A:
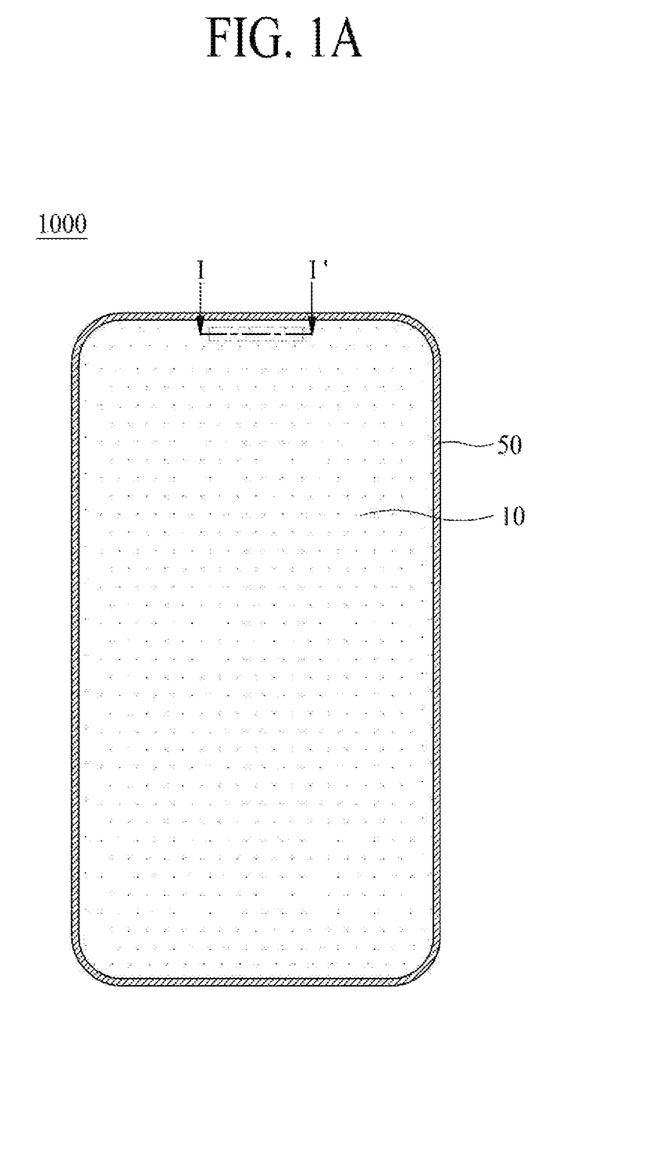
FIGS. 1A to 1C are diagrams illustrating a display apparatus according to an example embodiment of the present disclosure.
Figure 1B:
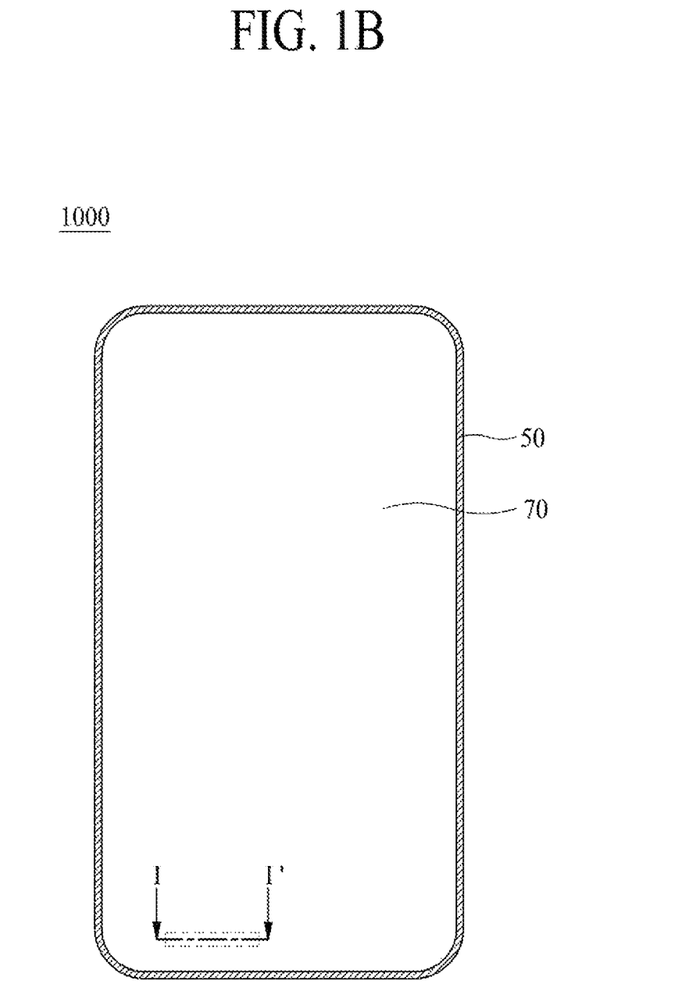
Figure 1C:
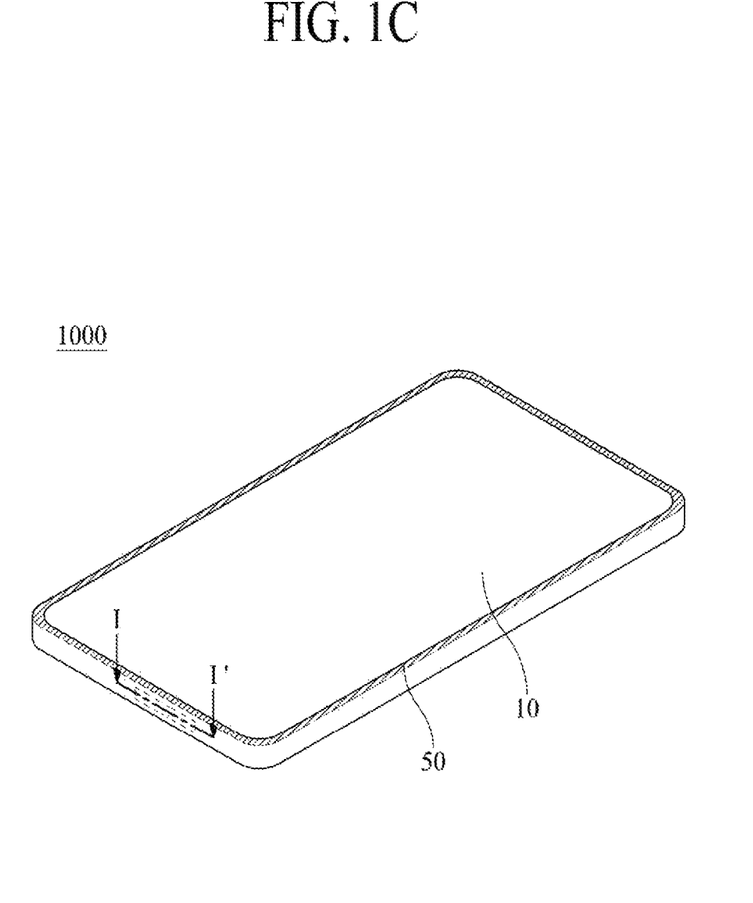

FIGS. 1A to 1C are diagrams illustrating a display apparatus according to an example embodiment of the present disclosure.

With reference to FIG. 1A, a display apparatus 1000 may include a display panel 10, which displays an image and a housing 50, which accommodates the display panel 10. A sound generator may be disposed in an upper portion of the display apparatus 1000.

The display panel 10 may be accommodated in the housing 50 and may display an image. Also, the display apparatus 1000 may include a driving circuit unit which drives the display panel 10.

The display panel 10 may be a light emitting display panel or a flexible light emitting display panel. This will be described below.

The display panel 10 according to an example embodiment may include a pixel array substrate including a pixel array having a plurality of pixels, an encapsulation layer which encapsulates the pixel array, and a polarization film that is attached on an upper surface of the encapsulation layer.

The plurality of pixels may be respectively provided in a plurality of pixel areas defined by a plurality of pixel driving lines. Also, each of the plurality of pixels may include a pixel circuit having at least two thin film transistors (TFTs) and at least one capacitor, and a light emitting device that emits light with a current supplied from the pixel circuit. For example, the light emitting device may include an organic light emitting layer or a quantum dot light emitting layer. As another example, the light emitting device may include a micro light emitting diode (LED).

The encapsulation layer may protect the TFTs and the light emitting device from an external impact and may prevent water or oxygen from penetrating into the light emitting device.

The polarization film may be attached on an upper surface of the encapsulation layer by a film attachment member. The polarization film may circularly polarize external light reflected by the TFTs and/or the pixel driving lines provided on the pixel array substrate, thereby enhancing the visibility and contrast ratio of the display panel 10.

Moreover, the display panel 10 may further include a barrier layer and a touch electrode layer disposed between the encapsulation layer and the polarization film. Also, the display panel 10 may further include a color filter layer provided on an upper surface of the encapsulation layer.

Alternatively, the encapsulation layer may be replaced with an encapsulation substrate, which is attached on the pixel array substrate by a filler surrounding the pixel array. In a case where the filler is a transparent filler, the encapsulation substrate may be a transparent encapsulation substrate.

The driving circuit unit may be connected to a pad part provided on the pixel array substrate of the display panel 10 and may supply a driving signal and a data signal to the pixel driving lines to allow each of the pixels to display an image.

Moreover, the display panel 10 may be a liquid crystal display panel. This will be described below.

The display panel 10 may include a first substrate, a second substrate, and a liquid crystal layer. Also, the first substrate may include a pixel electrode or a common electrode for controlling an alignment of liquid crystal molecules of the liquid crystal layer and may include a TFT connected to the pixel electrode. Also, the second substrate may include the color filter layer for realizing a color.

The display panel 10 may drive the liquid crystal layer with an electric field generated from a data voltage and a common voltage which are applied to each of the pixels, thereby controlling a light transmittance of the liquid crystal layer to display an image. The liquid crystal layer may be driven in various driving modes such as a twisted nematic (TN) mode, a vertical alignment (VA) mode, an in-plane switching (IPS) mode, and a fringe field switching (FFS) mode.

For example, the first substrate may be a TFT substrate and may include the plurality of pixels defined by a plurality of gate lines and a plurality of data lines which intersect one another. Each of the pixels may include a TFT connected to a corresponding gate line and a corresponding data line, a pixel electrode connected to the TFT, and a common electrode which is disposed adjacent to the pixel electrode and is supplied with the common voltage. Also, the common electrode may be provided on the second substrate, based on a driving mode of the liquid crystal layer. The driving circuit unit for driving the display panel 10 and the pad part connected to the driving circuit unit may be disposed on one side of the first substrate. The second substrate may be a color filter array substrate and may include the color filter layer. In a case where the display panel 10 is driven in a color filter on TFT (COT) mode or a TFT on color filter (TOC) mode, the color filter layer may be provided on the first substrate.

A backlight unit may be disposed under the display panel 10 and may irradiate light onto the display panel 10. The display panel 10 may control a transmittance of the light emitted from the backlight unit to display an image.

The display apparatus 1000 may be a display module which includes the display panel 10 and the driving circuit unit for driving the display panel 10. For example, the driving circuit unit may include an integrated circuit (IC) chip and a flexible printed circuit board (FPCB). The driving circuit unit such as a driving IC for applying a voltage may be mounted on the FPCB. Alternatively, the driving circuit unit may be implemented as a type such as a chip-on film (COF) type.

The gate lines and the data lines of the display panel 10 may be connected to the FPCB, and when an electrical signal is applied from the FPCB, the electrical signal may be applied to a source electrode and a drain electrode of the TFT. The FPCB may receive an image signal from the outside of the display panel 10 to apply a driving signal to the gate lines and the data lines of the display panel 10.

The FPCB may generate a gate signal and a data signal for driving the display panel 10 and a plurality of timing signals which allow the gate signal and the data signal to be applied at an appropriate time, and may apply the gate signal and the data signal to the gate lines and the data lines of the display panel 10. Also, the FPCB may include an amplifier.

A cover window may be provided on the display module. The cover window may be attached on a whole surface of the display module or a whole surface of the polarization film. The housing 50 may support the cover window.

With reference to FIG. 1B, a display apparatus 1000 may include a display panel which displays an image and a housing 50 which accommodates the display panel. A sound generator may be disposed in a partial region of a lower portion of a rear surface 70 of the display apparatus 1000. For example, the sound generator may be disposed on a rear surface of the housing 50.

With reference to FIG. 1C, a display apparatus 1000 may include a display panel 10 which displays an image and a housing 50 which accommodates the display panel 10. A sound generator may be disposed in a side portion of the display apparatus 1000. In FIG. 1C, the sound generator may be disposed in a partial region of a lower surface of the display apparatus 1000 among side surfaces surrounding a front surface and a rear surface of the display apparatus 1000. For example, the sound generator may be disposed in a lower portion among a side portion of the housing 50, but is not limited thereto. In other embodiments, the sound generator may be disposed in a partial region of a left portion or a right portion of the display apparatus 1000, or may be disposed in a partial region of an upper surface of the display apparatus 1000.

Figure 2:
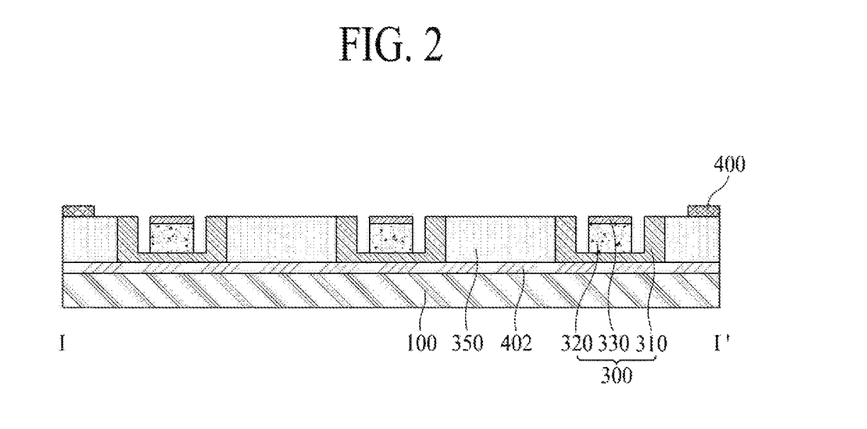
FIG. 2 is a cross-sectional view taken along line I-I' of FIGS. 1A to 1C and is a cross-sectional view of a sound generator according to an example embodiment of the present disclosure.

FIG. 2 is a cross-sectional view taken along line I-I' of FIGS. 1A to 1C and is a cross-sectional view of a sound generator according to an example embodiment of the present disclosure.

The sound generator, as described above with reference to FIGS. 1A to 1C, may be provided in at least one of an upper portion of a front surface of a display apparatus, a lower portion of a rear surface of the display apparatus, and a side portion of the display apparatus, but a position at which the sound generator is provided is not limited thereto. Also, the sound generator according to an example embodiment of the present disclosure may be applied as a sound generator provided in the display apparatus.

Figure 3:
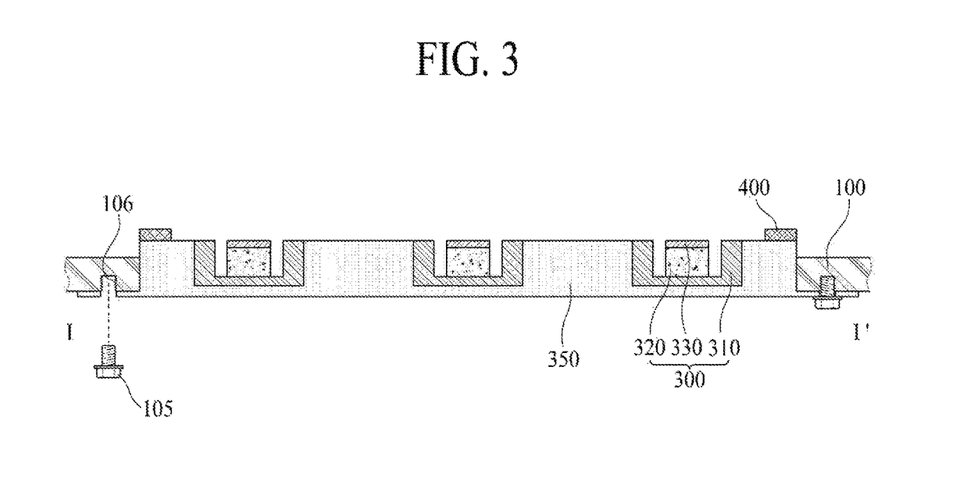
FIG. 3 is a cross-sectional view taken along line I-I' of FIGS. 1A to 1C and is a cross-sectional view of a sound generator according to another example embodiment of the present disclosure.

The sound generator may include one or more magnetic circuit units and one or more voice coil units. In FIGS. 2 and 3, the magnetic circuit units will be described. The sound generator may be referred to as an actuator, an exciter, or a transducer.

With reference to FIG. 2, a magnetic circuit unit 300 may be disposed on a supporting member 100. The supporting member 100 may support one or more of a rear surface and a side surface of a display panel 10. Moreover, the supporting member 100 may be a plate member which is provided on the rear surface or a whole surface of the display panel 10.

Moreover, in the present disclosure, the supporting member 100 may be referred to as a cover bottom, a plate bottom, a back cover, a base frame, a metal frame, a metal chassis, a chassis base, or an m-chassis. The supporting member 100 may include all types of frames or plate structures disposed on the rear surface of the display apparatus.

One or more magnetic circuit units 300 may be provided. In FIG. 2, three magnetic circuit units 300 are illustrated, but are not limited thereto.

A sound generator, which may be a speaker provided in display apparatuses such as mobile devices, may configure three speakers in an example, but in the sound generator according to an example embodiment of the present disclosure, each of a magnetic circuit unit and a voice coil unit may be divisionally provided. Therefore, in a case where three speakers are be provided, three voice coil units corresponding to three magnetic circuit units may be provided, and the three voice coil units may be provided as one body in connection with one another. Accordingly, one sound generator may be configured to perform functions of three speakers, thereby providing a sound generator capable of being miniaturized. An example where voice coil units are connected to one another will be described below with reference to FIG. 6.

The magnetic circuit unit 300 may be disposed on the supporting member 100 and may include a yoke 310 having a groove, a magnet 320 disposed in the groove of the yoke 310, and a plate 330 disposed on the magnet 320. The magnet 320 and the plate 300 may be accommodated into the groove of the yoke 310.

The groove of the yoke 310 may be formed through an insert injection molding process performed on the yoke 310. The groove may be formed in the yoke 310 by performing insert injection in a state where the yoke 310 is disposed in an insert injection mold. The yoke 310 may be connected to and provided as one body with a frame 350. Therefore, the frame 350 may be formed through an injection molding process performed on the yoke 310, and thus, may be referred to as an injection material.

In a case where the yoke 310 is formed through the insert injection molding process, the frame 350, which is an injection material and the yoke 310 may be connected to each other and provided as one body without the yoke 310 being attached on the frame 350 by an adhesive, and thus, a connecting force between the frame 350 and the yoke 310 is strengthened, thereby providing a magnetic circuit unit having high strength. Also, in a case where the yoke 310 is formed through the insert injection molding process, a process differential or a fabrication error caused by a worker when the yoke 310 is attached on the frame 350 by the adhesive is reduced.

At least one of the yoke 310 and the plate 330 may be formed of a material having magnetism, such as iron (Fe). Iron may permit a magnetic component to be well transferred to the magnet 320.

The magnet 320 may be disposed inside and on the yoke 310. The magnet 320 may be implemented with a sintered magnet, such as barium ferrite, and a material of the magnet 320 may include one or more of ferric oxide ($Fe_2O_3$), barium carbonate (or witherite) ($BaCO_3$), a neodymium (Nd) strontium ferrite ($Fe_{12}O_{19}Sr$), e.g., with an improved magnetic component, an alloy cast magnet including aluminum (Al), nickel (Ni), and cobalt (Co), and/or the like. As another example, the neodymium magnet may be neodymium-iron-boron (Nd—Fe—B). However, embodiments are not limited to these examples.

The plate 330 may be disposed on the magnet 320 and may allow a magnetic force of the magnet 320 to concentrate in a vertical direction.

The magnetic circuit unit 300 may be attached on the supporting member 100 by a first adhesive 402. The first adhesive 402 may be a double-sided tape, but embodiments are not limited thereto.

An adhesive member 400 may be disposed in a periphery of the magnetic circuit unit 300. The adhesive member 400 may be a double-sided tape, but embodiments are not limited thereto. The adhesive member 400 will be described below in detail with reference to FIGS. 4A and 4B.

FIG. 3 is a cross-sectional view taken along line I-I' of FIGS. 1A to 1C and is a cross-sectional view of a sound generator according to another example embodiment of the present disclosure.

With reference to FIG. 3, a sound generator may include one or more magnetic circuit units 300. The magnetic circuit units 300 may be disposed on a supporting member 100.

The supporting member 100 may support one or more of a rear surface and a side surface of a display panel 10. Moreover, the supporting member 100 may be a plate member which is provided on the rear surface or a whole surface of the display panel 10.

In the present disclosure, the supporting member 100 may be referred to as a cover bottom, a plate bottom, a back cover, a base frame, a metal frame, a metal chassis, a chassis base, or an m-chassis. Therefore, the supporting member 100 may include all types of frames or plate structures disposed on the rear surface of the display apparatus.

One or more magnetic circuit units 300 may be provided. In FIG. 3, three magnetic circuit units 300 are illustrated, but are not limited thereto.

A sound generator, which may be a speaker provided in display apparatuses such as mobile devices, may configure three speakers in an example, but in the sound generator according to an example embodiment of the present disclosure, each of a magnetic circuit unit and a voice coil unit may be divisionally provided. Therefore, in a case where three speakers are be provided, three voice coil units corresponding to three magnetic circuit units may be provided, and the three voice coil units may be provided as one body in connection with one another. Accordingly, one sound generator may be configured to perform functions of three speakers, thereby providing a sound generator capable of being miniaturized. An example where voice coil units are connected to one another will be described below with reference to FIG. 6.

A groove of a yoke 310 may be formed through an insert injection molding process performed on the yoke 310. The groove may be formed in the yoke 310 by performing insert injection in a state where the yoke 310 is disposed in an insert injection mold. The yoke 310 may be connected to and provided as one body with a frame 350. Therefore, the frame 350 may be formed through an injection molding process performed on the yoke 310, and thus, may be referred to as an injection material.

In a case where the yoke 310 is formed through the insert injection molding process, the frame 350, which is an injection material and the yoke 310 may be connected to each other and provided as one body without the yoke 310 being attached on the frame 350 by an adhesive, and thus, a connecting force between the frame 350 and the yoke 310 is strengthened, thereby providing a magnetic circuit unit having high strength. Also, in a case where the yoke 310 is formed through the insert injection molding process, a process differential or a fabrication error caused by a worker when the yoke 310 is attached on the frame 350 by the adhesive is reduced.

At least one of the yoke 310 and the plate 330 may be formed of a material having magnetism, such as iron (Fe). Iron enables a magnetic component to be well transferred to the magnet 320.

The magnet 320 may be disposed inside and on the yoke 310. The magnet 320 may be implemented with a sintered magnet such as barium ferrite, and a material of the magnet 320 may include one or more of ferric oxide ($Fe_2O_3$), barium carbonate (or witherite) ($BaCO_3$), a neodymium (Nd), strontium ferrite ($Fe_{12}O_{19}Sr$), e.g., with an improved magnetic component, an alloy cast magnet including aluminum (Al), nickel (Ni), and cobalt (Co), and/or the like. As another example, the neodymium magnet may be neodymium-iron-boron (Nd—Fe—B). However, embodiments are not limited to these examples.

The plate 330 may be disposed on the magnet 320 and may allow a magnetic force of the magnet 320 to concentrate in a vertical direction.

Moreover, the magnetic circuit unit 300 may be connected to a supporting hole 106 provided in the supporting member 100. For example, the magnetic circuit unit 300 may be fixed to the supporting member 100 by a fixing member 105 inserted into the supporting hole 106 provided in the supporting member 100. The fixing member 105 may be a screw, but is not limited thereto. In a case where the magnetic circuit unit 300 is connected to the supporting member 100 by the fixing member 105, an injection material, which is the frame 350 may form an external appearance, and the sound generator according to the example embodiment may be slimmer than the sound generator of FIG. 2.

An adhesive member 400 may be disposed in a periphery of the magnetic circuit unit 300. The adhesive member 400 may be a double-sided tape, but is not limited thereto. The adhesive member 400 will be described below in detail with reference to FIGS. 4A and 4B.

An example where one or more magnetic circuit units and one or more voice coil units configuring a sound generator are connected to each other will be described below in detail with reference to FIGS. 4A and 4B.

Figure 4A:
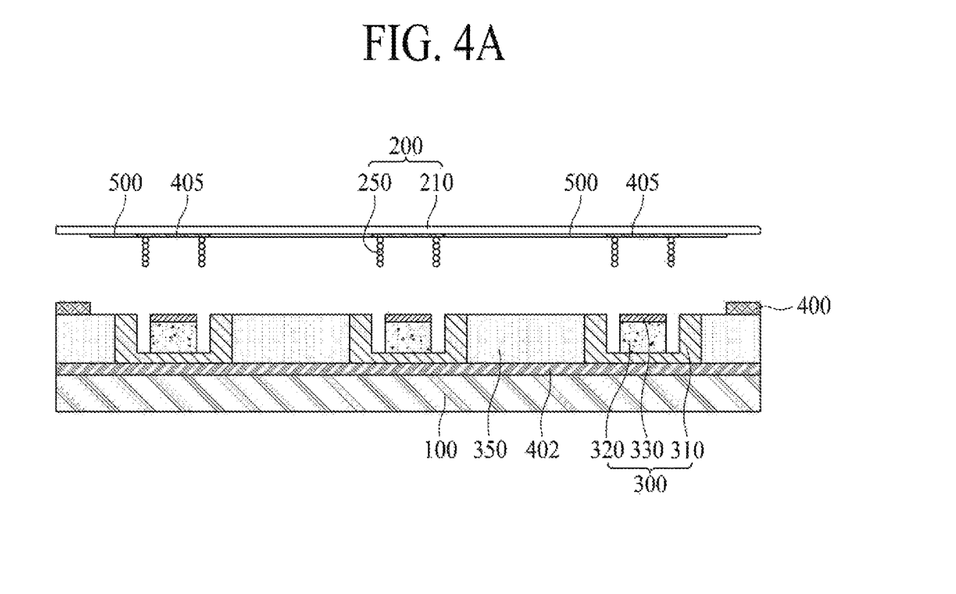
FIGS. 4A and 4B are diagrams illustrating a connection structure of a magnetic circuit unit and a voice coil unit configuring a sound generator according to an example embodiment of the present disclosure.
Figure 4B:
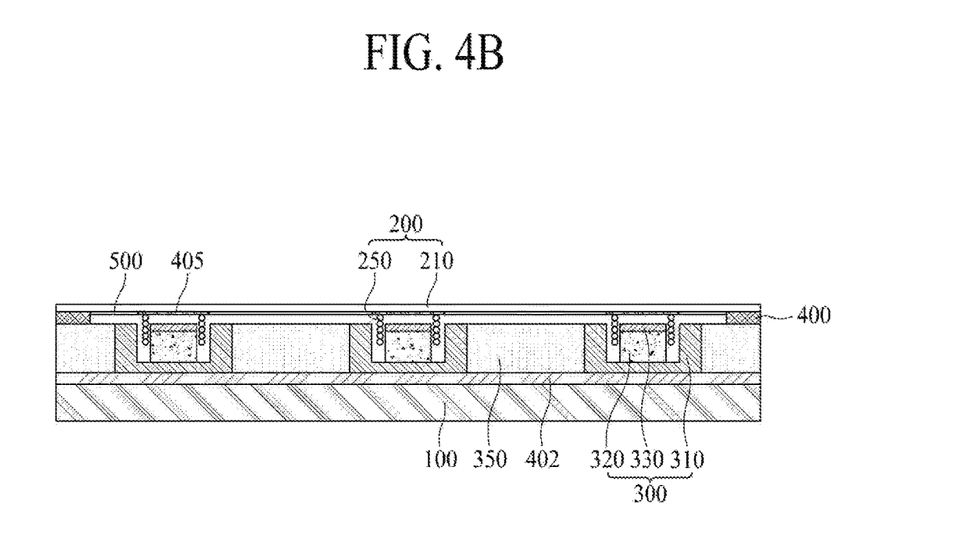

FIGS. 4A and 4B are diagrams illustrating a connection structure of a magnetic circuit unit and a voice coil unit configuring a sound generator according to an example embodiment of the present disclosure. For example, FIGS. 4A and 4B are diagrams illustrating the magnetic circuit unit configuring the sound generator illustrated in FIG. 2. FIGS.

4A and 4B may be identically applied to the magnetic circuit unit configuring the sound generator illustrated in FIG. 3. A description of a magnetic circuit unit 300 is the same as the description given above with reference to FIG. 2.

With reference to FIG. 4A, at least one magnetic circuit unit 300 may be disposed on a supporting member 100. The magnetic circuit unit 300 may be disposed on the supporting member 100 and may include a yoke 310 including a groove, a magnet 320 disposed in the groove of the yoke 310, and a plate 330 disposed on the magnet 320.

At least one voice coil unit 200 may include a vibration plate 210 and at least one voice coil 250 disposed on the vibration plate 210. The vibration plate 210 may be formed of a light material, and thus, is capable of being slimmed. For example, the vibration plate 210 may be formed of plastic, magnesium (Mg), and/or the like, but is not limited thereto.

In order to apply a signal or a current to the at least one voice coil 250, a wiring 500 may be further provided in the vibration plate 210. For example, the wiring 500 may receive a signal or a current from a driving circuit unit of a display apparatus and may apply the received signal or current to the voice coil 250. The wiring 500 may be connected to the driving circuit unit provided in the display apparatus. For example, the wiring 500 may be connected to a wire or an FPCB provided in the driving circuit unit. Also, the wiring 500 may be supplied with a signal or a current from an audio amplifier provided in the driving circuit unit.

In other example embodiments, without providing a separate wiring, the voice coil 250 may be supplied with the signal or the current from the audio amplifier of the driving circuit unit through a wiring extending to the voice coil 250. The wiring 500 may be provided in a portion except at a portion where a second adhesive 405 is disposed, but embodiments are not limited thereto.

One voice coil unit 200 may be provided in correspondence with one magnetic circuit unit 300. The at least one voice coil 250 may be attached on the vibration plate 210 by the second adhesive 405. The second adhesive 405 may be a double-sided tape or a bond, but is not limited thereto. If a bond is used for attaching the voice coil 250 on the vibration plate 210, the voice coil 250 may be more solidly attached on the vibration plate 210, and thus, a movement of the voice coil 250 caused by a vibration is reduced, thereby enhancing a sound output characteristic. Also, matching between the magnetic circuit unit 300 and the voice coil 250 is important in connecting the voice coil unit 200 to the magnetic circuit unit 300, and thus, when a movement of the voice coil 250 is small, a height of the voice coil 250 is reduced. Accordingly, if a bond is used for attaching the voice coil 250 on the vibration plate 210, a movement of the voice coil 250 is reduced, and thus, a height of the voice coil 250 is reduced, thereby decreasing a thickness of a sound generator.

The voice coil 250 may be provided in a circular shape, an oval shape, or the like, but embodiments are not limited thereto. An oval shape may include an elliptical shape, an egg-shape, a rectangular shape with rounded corners, or other non-circular curved shape having a width different from its height. If the voice coil 250 is provided in an oval shape, a sound having a high-pitched sound band may be improved in comparison to a circular shape, and heat occurring due to a vibration of the voice coil 250 may be reduced, thereby enhancing a heat dissipation characteristic.

In a case where the voice coil 250 is configured without a bobbin, a thickness and weight are reduced by the absence of the bobbin. However, the example embodiment is not limited thereto, and the voice coil 250 may be configured with a bobbin and a coil wound around the bobbin.

FIG. 4B is a diagram illustrating a connection structure of a magnetic circuit unit 300 and a voice coil unit 200 configuring a sound generator. With reference to FIG. 4B, a voice coil 250 of the voice coil unit 200 may be disposed in a yoke 310 of the magnetic circuit unit 300. For example, the voice coil 250 may be disposed outside a magnet 320 disposed on the yoke 310. If the voice coil 250 is disposed outside the magnet 320, a magnetic force generated between the voice coil 250 and the magnet 320 is prevented from being leaked, thereby enhancing a magnetic force density.

One or more of each of the magnetic circuit unit 300 and the voice coil unit 200 may be provided, and the one or more magnetic circuit units 300 may be attached on the one or more voice coil units 200 by an adhesive member 400 provided in a periphery of the magnetic circuit unit 300. The adhesive member 400 may be a double-sided tape, but is not limited thereto.

The adhesive member 400 may be referred to as a foam pad. In a case where the adhesive member 400 is applied as a foam pad, the adhesive member 400 may correspond to a space or an air gap where a sound is generated when a display panel 10 vibrates. An air gap or a space which generates or transfers a sound may be referred to as a partition or may be referred to as an enclosure or a baffle, but the term is not limited thereto. Moreover, the adhesive member 400 may act as a damper or an edge.

A vibration may occur for applying a signal or a current to the voice coil 250, and thus, a wiring 500 may be further provided in a vibration plate 210. For example, the wiring 500 may receive a signal or a current from a driving circuit unit of a display apparatus and may apply the received signal or current to the voice coil 250. The wiring 500 may be connected to the driving circuit unit provided in the display apparatus. For example, the wiring 500 may be connected to a wire or an FPCB provided in the driving circuit unit. Also, the wiring 500 may be supplied with a signal or a current from an audio amplifier provided in the driving circuit unit.

In other example embodiments, without providing a separate wiring, the voice coil 250 may be supplied with the signal or the current from the audio amplifier of the driving circuit unit through a wiring extending to the voice coil 250.

An example where a display panel generates a sound by using a sound generator according to an example embodiment of the present disclosure will be described below with reference to FIG. 5.

Figure 5:
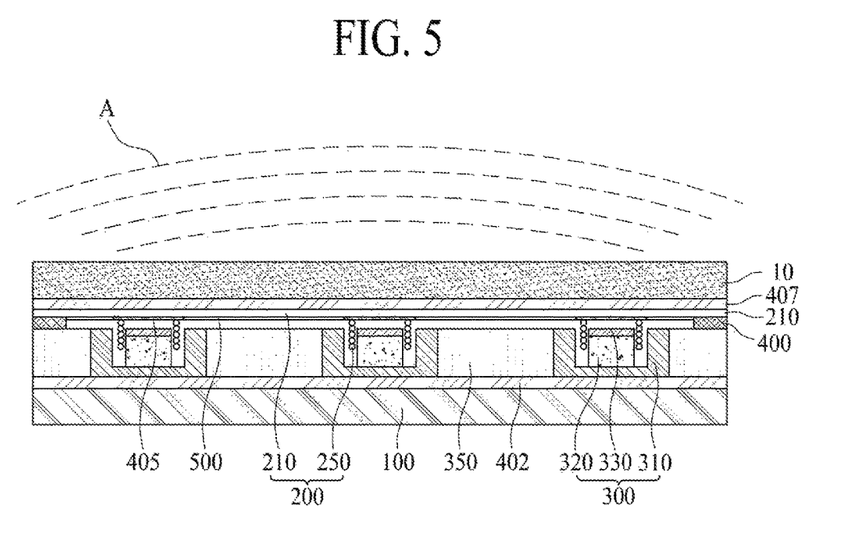
FIG. 5 is a diagram for describing an operation of generating a sound by a sound generator according to an example embodiment of the present disclosure.

FIG. 5 is a diagram for describing an operation of generating, by a sound generator according to an embodiment of the present disclosure, a sound. With reference to FIG. 5, a voice coil unit 200 configuring a sound generator may be provided on a rear surface of a display panel 10. The voice coil unit 200 may be attached on the display panel 10 by a third adhesive 407. The third adhesive 407 may be a double-sided tape, but is not limited thereto.

When a signal or a current is applied to a voice coil 250, a magnet 320 disposed on a yoke 310 may generate a magnetic force, such as attraction or repulsion, based on a magnetic field generated by the voice coil 250. Also, a plate 330 disposed on the magnet 320 may allow the magnetic force of the magnet 320 to concentrate in a vertical direction. Also, the voice coil 250 located in a magnetic field generated by the magnet 320 may upwardly and downwardly vibrate according to Fleming's law. Due to such a vibration, the vibration plate 210 disposed on the voice coil 250 may upwardly and downwardly vibrate. Such a vibration may be transferred to the display panel 10, and a sound A may be output by the transferred vibration.

The sound A output from the display panel 10 may include a sound having a middle-high-pitched sound band and a sound having a low-pitched sound band. Here, the middle-pitched sound band may be sound of about 200 Hz to about 3 kHz, and the high-pitched sound band may be sound of about 3 kHz or more. However, the example embodiment is not limited thereto. The low-pitched sound band may be about 200 Hz or less, but embodiments are not limited thereto. Therefore, in comparison with piezo ceramics, the sound generator according to an example embodiment of the present disclosure may output a sound having the middle-high-pitched sound band and a sound having the low-pitched sound band, thereby providing a display apparatus having an enhanced sound output characteristic.

A signal or a current applied to the voice coil 250 may be applied through a wiring 500 provided in the vibration plate 210. For example, the wiring 500 may receive a signal or a current from a driving circuit unit of a display apparatus and may apply the received signal or current to the voice coil 250. Also, a signal or a current may be applied to the voice coil 250 through an audio amplifier of the display apparatus.

If an adhesive member 400 acts as a damper or an edge, the voice coil 250 is prevented from laterally vibrating, thereby preventing a lateral movement of the vibration plate 210.

Figure 6:
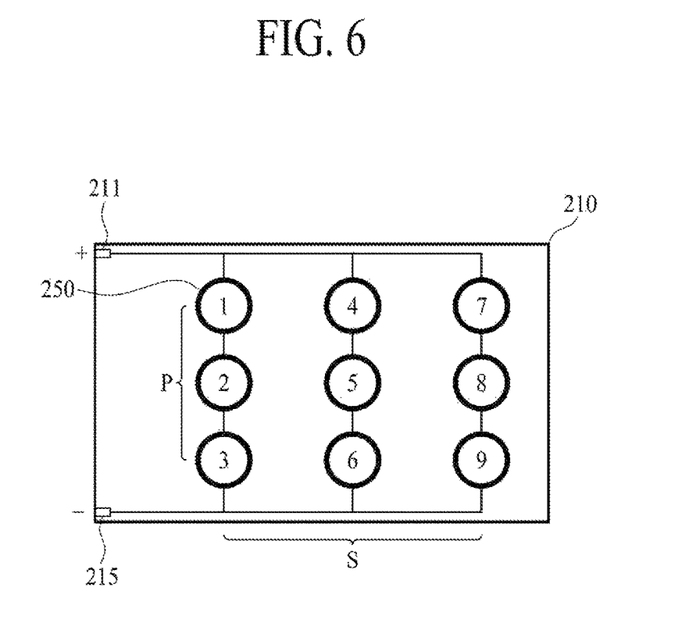
FIG. 6 is a diagram illustrating an example for connecting a voice coil according to an example embodiment of the present disclosure.

FIG. 6 is a diagram illustrating an example for connecting a voice coil according to an example embodiment of the present disclosure.

With reference to FIG. 6, a voice coil 250 may be disposed in a vibration plate 210. As shown in FIG. 6, an example where nine voice coils 250 are provided will be described. If the nine voice coils 250 are provided, a magnetic circuit unit may be configured in correspondence with the nine voice coils 250. The disposition of the voice coils 250 is not limited to the illustration of FIG. 6. Also, the voice coil 250 is illustrated in a circular shape, but without being limited thereto. For example, the voice coil 250 may be provided in an oval shape or a polygonal shape, in addition to a circular shape.

The voice coils 250 may be arranged in a widthwise direction and a lengthwise direction of the vibration plate 210. Voice coils 250 arranged in the widthwise direction may be connected (S) to one another in parallel, and voice coils 250 arranged in the lengthwise direction may be serially connected (P) to one another.

A positive '+' signal 211 and a negative '−' signal 215 may be applied to the voice coils 250. The voice coils 250 may upwardly and downwardly vibrate based on the signals 211 and 215 applied to the voice coils 250. The signals 211 and 215 applied to the voice coils 250 may be applied from an audio amplifier of a display apparatus. Also, the signals 211 and 215 applied to the voice coils 250 may be applied through wirings provided in the vibration plate 250.

A resistance of one voice coil 250 generated from a current applied to the voice coils 250 may be, for example, 6Ω (ohms). Therefore, a total resistance generated in the nine voice coils 250 arranged as shown in FIG. 6 may be 6Ω. By connecting the voice coils 250 in series and parallel, impedance may become 6Ω and may match an output of the amplifier.

The impedance may be a resistance value of the voice coil 250. As the impedance increases, a sound may become smooth and delicate, but an output is lowered. On the other hand, if the impedance is low, a value of a current usage may be high, and due to this, a problem may occur in a driving circuit. Therefore, based on a design of a voice coil, the impedance may be adjusted to match the output of the amplifier.

If a frequency of the voice coil included in the sound generator according to an example embodiment of the present disclosure is applied, the sound generator may be applied as a vibration motor.

By using a frequency other than an audible frequency while the sound generator according to an example embodiment of the present disclosure is vibrating, the sound generator may perform a haptic function. The display panel 10 may be vibrated by the sound generator, and in this case, a low vibration may occur instead of the audible frequency. Such a frequency may not be heard by a user, and even when the frequency is differently used, the frequency may not affect sound quality.

Furthermore, a touch may be sensed by sensing a vibration which varies when a user touches the display apparatus. Sensing of a touch may be a sensing operation for determining the occurrence or not of the touch and may be applied along with the haptic function. The haptic function may transfer a tactile feedback, which is capable of being felt by a stylus pen or a finger of a user, as a feedback based on a touch input of the user. For example, the haptic function may be implemented by checking whether a user touch is performed or not, based on a vibration instead of the audible frequency output from the sound generator. Also, a sensor may be further provided for sensing a vibration having a low frequency instead of the audible frequency, and the sensor may be implemented in an image controller or a control unit of a portable terminal such as a mobile device for displaying an image. Also, a sensor for sensing a voltage generated in the sound generator may be further provided for sensing pressure with the sound generator. Alternatively, in a case where an amplifier and a sensor are time-divisionally driven, a function of a pressure sensor may be implemented by using one amplifier.

When a sound wave is generated instead of the audible frequency generated in the sound generator, the sound wave may be input to a microphone of an electronic device. A motion sensing function of sensing a variation of the sound wave input to the microphone to sense a movement of a finger of a user may be performed. A microphone may be further provided for sensing a motion. In electronic devices including a microphone, motion sensing may be performed without additionally providing a microphone.

The display apparatus according to an example embodiment of the present disclosure may be applied to mobile devices. For example, the mobile devices may be small devices such as smartphones, mobile communication terminals, mobile phones, tablet personal computers (PCs), and personal digital assistants (PDAs), but are not limited thereto. In a case where the display apparatus is installed in a mobile device, an internal battery may be used without supplying an external power, and thus, the elements of the display apparatus may be designed so as to be suitable for a limited battery capacity. Also, in a case where a user watches a video or performs a game or a button input by using a mobile device, the user may feel a vibration along with a touch, and thus, may obtain more sensual information.

Moreover, the sound generator according to an example embodiment of the present disclosure may be applied as a sound generator provided in a display apparatus. The display apparatus according to an example embodiment of the present disclosure may be applied to mobile devices, video phones, smart watches, watch phones, wearable devices, foldable devices, rollable devices, bendable devices, flexible devices, curved devices, portable multimedia players (PMPs), personal digital assistants (PDAs), electronic organizers, desktop personal computers (PCs), laptop PCs, netbook computers, workstations, navigation devices, automotive navigation devices, automotive display apparatuses, televisions (TVs), notebook computers, monitors, cameras, camcorders, home appliances, etc.

A display apparatus according to an example embodiment of the present disclosure will be described below.

A display apparatus according to an example embodiment of the present disclosure includes a display panel configured to display an image by emitting light, a supporting member on a rear surface of the display panel, and a sound generator between the display panel and the supporting member, wherein the sound generator includes a magnetic circuit unit and a voice coil unit on the rear surface of the display panel, and the magnetic circuit unit and the voice coil unit are configured to vibrate the display panel to generate sound.

According to some embodiments of the present disclosure, the magnetic circuit unit may be on the supporting member and may be attached to the supporting member by an adhesive.

According to some embodiments of the present disclosure, the supporting member may further include a supporting hole, and the magnetic circuit unit may be connected to the supporting hole.

According to some embodiments of the present disclosure, the magnetic circuit unit may include a yoke including a groove, a magnet in the groove of the yoke, and a plate on the magnet.

According to some embodiments of the present disclosure, the voice coil unit may include a vibration plate and a voice coil on the vibration plate.

According to some embodiments of the present disclosure, the display panel may include a driving circuit unit configured to drive the display panel, and the voice coil may be supplied with a signal from the driving circuit unit.

According to some embodiments of the present disclosure, the voice coil may be arranged in plural number in a widthwise direction and a lengthwise direction of the vibration plate, the voice coils in the lengthwise direction may be serially connected to one another, and the voice coils in the widthwise direction may be connected to one another in parallel.

According to some embodiments of the present disclosure, the voice coil unit may include a vibration plate and a voice coil and a wiring on the vibration plate.

According to some embodiments of the present disclosure, the display panel may include a driving circuit unit configured to display the display panel, and the wiring may receive a signal from the driving circuit unit and may apply the received signal to a corresponding voice coil.

According to some embodiments of the present disclosure, the voice coil unit may include a vibration plate and a voice coil on the vibration plate, and the voice coil may be attached to the vibration plate by an adhesive.

According to some embodiments of the present disclosure, the voice coil unit may be attached to the display panel by an adhesive.

According to some embodiments of the present disclosure, the display apparatus may further comprise a frame, and the frame and the yoke may be connected to each other and provided as one body through an insert injection molding process performed on the yoke.

A display apparatus according to an example embodiment of the present disclosure includes a display panel configured to display an image by emitting light, a supporting member on a rear surface of the display panel, a magnetic circuit unit between the display panel and the supporting member, and a voice coil unit including a vibration plate on a rear surface of the display panel and a voice coil on the vibration plate, wherein the magnetic circuit unit and the voice coil unit are configured to vibrate the display panel to generate sound.

According to some embodiments of the present disclosure, the magnetic circuit unit may be on the supporting member and may be attached to the supporting member by an adhesive.

According to some embodiments of the present disclosure, the supporting member may include a supporting hole, and the magnetic circuit unit may be connected to the supporting hole.

According to some embodiments of the present disclosure, the magnetic circuit unit may include a yoke including a groove, a magnet in the groove of the yoke, and a plate on the magnet.

According to some embodiments of the present disclosure, the voice coil may be attached to the vibration plate by an adhesive.

According to some embodiments of the present disclosure, the display panel may include a driving circuit unit configured to drive the display panel, and the voice coil may be supplied with a signal from the driving circuit unit.

According to some embodiments of the present disclosure, the voice coil may be arranged in plural number in a widthwise direction and a lengthwise direction of the vibration plate, the voice coils arranged in the lengthwise direction may be serially connected to one another, and the voice coils arranged in the widthwise direction may be connected to one another in parallel.

According to some embodiments of the present disclosure, the display panel may include a driving circuit unit configured to drive the display panel, the voice coil unit may include a wiring on the vibration plate, and the wiring may receive a signal from the driving circuit unit and may apply the received signal to a corresponding voice coil.

According to some embodiments of the present disclosure, the voice coil unit may be attached to the display panel by an adhesive.

According to some embodiments of the present disclosure, the display apparatus may further comprise a frame, and the frame and the yoke may be connected to each other and provided as one body through an insert injection molding process performed on the yoke.

According to the embodiments of the present disclosure, a sound generator may include a magnetic circuit unit and a voice coil unit, thereby providing a display apparatus including a sound generator capable of being miniaturized.

Moreover, in the display apparatus according to the embodiments of the present disclosure, because a vibration plate may be attached to a voice coil by the adhesive, a movement of a voice coil may be reduced, and thus, a height of the voice coil may be reduced, thereby decreasing a thickness of the sound generator.

Moreover, in the display apparatus according to the embodiments of the present disclosure, a magnetic circuit unit may be fixed to a supporting member by using a fixing member included in the supporting member, thereby providing a display apparatus including a sound generator capable of being slimmed.

Moreover, in the display apparatus according to the embodiments of the present disclosure, a sound generator may include a magnetic circuit unit and a voice coil unit, thereby providing a display apparatus having an enhanced sound output characteristic.

It will be apparent to those skilled in the art that various modifications and variations may be made in the present disclosure without departing from the spirit or scope of the disclosures. Thus, it is intended that embodiments of the present disclosure cover the modifications and variations of the disclosure provided they come within the scope of the appended claims and their equivalents.

What is claimed is:

1. A display apparatus, comprising:
    a display panel configured to display an image by emitting light;
    a supporting member on a rear surface of the display panel; and
    a sound generator between the display panel and the supporting member,
    wherein:
    the sound generator includes a magnetic circuit unit and a voice coil unit on the rear surface of the display panel, and
    the magnetic circuit unit and the voice coil unit are configured to vibrate the display panel to generate sound.

2. The display apparatus of claim 1, wherein the magnetic circuit unit is on the supporting member and is attached to the supporting member by an adhesive.

3. The display apparatus of claim 1, wherein:
    the supporting member includes a supporting hole, and
    the magnetic circuit unit is connected to the supporting hole.

4. The display apparatus of claim 1, wherein the magnetic circuit unit comprises:
    a yoke including a groove;
    a magnet in the groove of the yoke; and
    a plate on the magnet.

5. The display apparatus of claim 1, wherein the voice coil unit comprises:
    a vibration plate; and
    a voice coil on the vibration plate.

6. The display apparatus of claim 5, wherein:
    the display panel includes a driving circuit unit configured to drive the display panel, and
    the voice coil is supplied with a signal from the driving circuit unit.

7. The display apparatus of claim 5, wherein:
    the voice coil is arranged in plural number in a widthwise direction and a lengthwise direction of the vibration plate,
    the voice coils in the lengthwise direction are serially connected to one another, and
    the voice coils in the widthwise direction are connected to one another in parallel.

8. The display apparatus of claim 1, wherein the voice coil unit comprises:
    a vibration plate; and
    a voice coil and a wiring on the vibration plate.

9. The display apparatus of claim 8, wherein:
    the display panel includes a driving circuit unit configured to drive the display panel, and
    the wiring receives a signal from the driving circuit unit and applies the received signal to a corresponding voice coil.

10. The display apparatus of claim 1, wherein the voice coil unit comprises:
    a vibration plate; and
    a voice coil on the vibration plate, and
    the voice coil is attached to the vibration plate by an adhesive.

11. The display apparatus of claim 1, wherein the voice coil unit is attached on the display panel by an adhesive.

12. The display apparatus of claim 4, wherein the display apparatus further comprises a frame, and the frame and the yoke are connected to each other and provided as one body through an insert injection molding process performed on the yoke.

13. A display apparatus, comprising:
    a display panel configured to display an image by emitting light;
    a supporting member on a rear surface of the display panel;
    a magnetic circuit unit between the display panel and the supporting member; and
    a voice coil unit including a vibration plate on a rear surface of the display panel and a voice coil on the vibration plate,
    wherein the magnetic circuit unit and the voice coil unit are configured to vibrate the display panel to generate a sound.

14. The display apparatus of claim 13, wherein the magnetic circuit unit is on the supporting member and is attached to the supporting member by an adhesive.

15. The display apparatus of claim 13, wherein:
    the supporting member includes a supporting hole, and
    the magnetic circuit unit is connected to the supporting hole.

16. The display apparatus of claim 13, wherein the magnetic circuit unit comprises:
    a yoke including a groove;
    a magnet in the groove of the yoke; and
    a plate on the magnet.

17. The display apparatus of claim 13, wherein the voice coil is attached to the vibration plate by an adhesive.

18. The display apparatus of claim 13, wherein:
    the display panel includes a driving circuit unit configured to drive the display panel, and
    the voice coil is supplied with a signal from the driving circuit unit.

19. The display apparatus of claim 13, wherein:
    the voice coil is arranged in plural number in a widthwise direction and a lengthwise direction of the vibration plate,
    the voice coils in the lengthwise direction are serially connected to one another, and
    the voice coils in the widthwise direction are connected to one another in parallel.

20. The display apparatus of claim 13, wherein:
    the display panel includes a driving circuit unit configured to drive the display panel,
    the voice coil unit includes a wiring on the vibration plate, and
    the wiring receives a signal from the driving circuit unit and applies the received signal to a corresponding voice coil.

21. The display apparatus of claim 13, wherein the voice coil unit is attached on the display panel by an adhesive.

22. The display apparatus of claim 16, wherein the display apparatus further comprises a frame, and the frame and the yoke are connected to each other and provided as one body through an insert injection molding process performed on the yoke.

* * * * *